(12) United States Patent
Kim et al.

(10) Patent No.: US 7,524,542 B2
(45) Date of Patent: *Apr. 28, 2009

(54) NEGATIVE C-PLATE TYPE OPTICAL ANISOTROPIC FILM COMPRISING POLY CYCLOOLEFIN AND METHOD FOR PREPARING THE SAME

(75) Inventors: Won-Kook Kim, Daejeon (KR); Sung-Ho Chun, Daejeon (KR); Sung-Cheol Yoon, Daejeon (KR); Tae-Sun Lim, Daejeon (KR); Heon Kim, Daejeon (KR); Jung-Min Lee, Daejeon (KR); Jeong-Su Yu, Daejeon (KR)

(73) Assignee: LG Chem, Ltd. (KR)

( * ) Notice: Subject to any disclaimer, the term of this patent is extended or adjusted under 35 U.S.C. 154(b) by 116 days.

This patent is subject to a terminal disclaimer.

(21) Appl. No.: 10/498,152

(22) PCT Filed: Nov. 19, 2003

(86) PCT No.: PCT/KR03/02493

§ 371 (c)(1), (2), (4) Date: Jun. 8, 2004

(87) PCT Pub. No.: WO2004/049011

PCT Pub. Date: Jun. 10, 2004

(65) Prior Publication Data

US 2005/0014913 A1    Jan. 20, 2005

(30) Foreign Application Priority Data

Nov. 22, 2002    (KR) .................. 10-2002-0073129

(51) Int. Cl.
C09K 19/00   (2006.01)
G02F 1/1335  (2006.01)
C08F 32/08   (2006.01)

(52) U.S. Cl. .................. 428/1.3; 428/1.33; 427/164; 427/385.5; 427/508; 264/1.34; 264/1.35; 526/281; 526/282; 525/210; 349/117

(58) Field of Classification Search .............. 428/1.3, 428/1.33; 427/164, 385.5, 508; 526/281, 526/282; 525/210; 264/1.34, 1.35; 349/117
See application file for complete search history.

(56) References Cited

U.S. PATENT DOCUMENTS

| | | | |
|---|---|---|---|
| 5,344,916 | A | 9/1994 | Harris et al. |
| 5,583,679 | A | 12/1996 | Ito et al. |
| 5,705,503 | A | 1/1998 | Goodall et al. |
| 6,800,697 | B2 * | 10/2004 | Uchiyama et al. ........... 525/469 |
| 7,015,276 | B2 * | 3/2006 | Morita et al. .............. 524/553 |
| 2001/0008920 | A1 * | 7/2001 | Arakawa .................. 525/210 |
| 2002/0042461 | A1 * | 4/2002 | Oshima et al. ............ 524/236 |

FOREIGN PATENT DOCUMENTS

| | | |
|---|---|---|
| JP | 4923828 B | 6/1974 |
| JP | 5313223 B | 5/1978 |
| JP | 55734 B | 1/1980 |
| JP | 5718175 B | 4/1982 |
| JP | 5914735 B | 4/1984 |
| JP | 03021902 | 1/1991 |
| JP | 05230161 A | 9/1993 |
| JP | 06-194646 | 7/1994 |
| JP | 07-128659 | 5/1995 |
| JP | 07-287123 | 10/1995 |
| JP | 11119025 | 4/1999 |
| JP | 2000-043202 | 2/2000 |
| JP | 2000-241627 | 9/2000 |
| JP | 2001062874 | 3/2001 |
| JP | 2002-114826 | 4/2002 |
| JP | 2002-182036 | 6/2002 |
| JP | 2002-327024 | 11/2002 |
| JP | 2003-057439 | 2/2003 |
| JP | 2003050316 | 2/2003 |
| WO | 0055657 | 9/2000 |
| WO | WO 02/28966 * | 4/2002 |
| WO | 02088783 | 11/2002 |

OTHER PUBLICATIONS

Mathew, et al.; "(n3-Allyl)palladium(II) and Palladium(II) Nitrile Catalysts for the Addition Polymerization of Norbornene Derivatives with Functional Groups"; Macromolecules; vol. 29; pp. 2755-2763; 1996.

Breunig, et al.; "Transition-metal-catalyzed vinyl addition polymerizations of norbornene derivatives with ester groups"; Makromol. Chem.; vol. 193; pp. 2915-2927; 1992.

Hennis, et al.; "Novel, Efficient, Palladium-Based System for the Polymerization of Norbornene Derivatives: Scope and Mechanism"; Organolmetallics; vol. 20; pp. 2802-2812; 2001.

(Continued)

Primary Examiner—Fred M Teskin
(74) Attorney, Agent, or Firm—Cantor Colburn LLP

(57) ABSTRACT

The present invention provides a negative C-plate type optical anisotropic film having negative birefringence along the thickness direction. In particular, the present invention provides a film comprising cycloolefin addition polymer, which is prepared by addition polymerizing norbornene-based monomers, a method for preparing the same, and a liquid crystal display comprising the same. The film of the present invention can be used for optical compensation films of a variety of LCD (liquid crystal display) modes because the refractive index alone the thickness direction can be controlled by the kind and amount of functional groups introduced to the cycloolefin addition polymer.

20 Claims, No Drawings

OTHER PUBLICATIONS

"Hoechst AG, Mitsui to make cyclo-olefins"; Plastic News; p. 24; Feb. 27, 2005.

Patel, K.S., et al.; "Three-Dimensional Dielectric Characterization of Polymer Films"; Journal of Applied Polymer Science; vol. 80; pp. 2328-2334; 2001.

International Search Report dated Feb. 20, 2007 for Application No. PCT/KR2003/002493 (All references cited in Search Report are listed above).

Chinese Office Action dated Aug. 3, 2007 for Application No. 200380100113.9 (All references cited in Office Action are listed above).

* cited by examiner

NEGATIVE C-PLATE TYPE OPTICAL ANISOTROPIC FILM COMPRISING POLY CYCLOOLEFIN AND METHOD FOR PREPARING THE SAME

BACKGROUND OF THE INVENTION (a) Field of the Invention

The present invention relates to an optical film prepared from a polycycloolefin, and more particularly to an optical anisotropic-compensation film comprising a polycycloolefin, having negative birefringence along the thickness direction ($n_x \approx n_y > n_z$; $n_x$=refractive index along the slow axis; $n_y$=refractive index along the fast axis; $n_y$=refractive index along the fast axis; $n_z$=refractive index along the thickness direction), and a method for preparing the same.

(b) Description of the Related Art

Use of liquid crystal displays (LCDs) is on the rapid increase, since they consume less power and are, thereby capable of running for hours using a battery, they save space, and are more lightweight than cathode ray tube (CRT) displays. Recently, use of medium-to-large sized LCDs has been on the increase in computer monitors and TVs. Particularly, in medium-to-large sized LCDs, it is important to offer good image quality over a wide view angle and to improve contrast when the driving cell is turned ON/OFF.

For this reason, a variety of liquid crystal mode displays, such as dual domain TN, ASM (axially symmetric aligned microcell), VA (vertical alignment), SE (surrounding electrode), PVA (patterned VA), and IPS (in-plane switching), have been developed. Each of these modes has its own liquid crystal arrangement and unique optical anisotropy. Accordingly, a variety of compensation films are required to compensate for the linearly polarized light's change in the optical axis due to the optical anisotropy of liquid crystals in LCDs.

The compensation film plays an important role in solving light leakage of the vertical polarizing element at about 45° from the optical axis, as well as in optically compensating the optical anisotropy of liquid crystals in LCDs. Therefore, development of an optical film capable of accurately and effectively controlling the optical anisotropy is the most important factor for optical compensation of a variety of liquid crystal display modes.

The optical anisotropy is expressed in $R_{th}$, which is the phase difference along the fast axis (y-axis) and along the thickness direction (z-axis), and $R_e$, which is the in-plane phase difference, as shown in the following Equation 1 and Equation 2:

$$R_{th} = \Delta(n_y - n_z) \times d \quad \text{Equation 1}$$

$$R_e = \Delta(n_x - n_y) \times d \quad \text{Equation 2}$$

In Equations 1 and 2, $n_x$ is the in-plane refractive index along the machine direction or along the slow axis (x-axis), $n_y$ is the in-plane refractive index along the transverse direction or along the fast axis (y-axis), $n_z$ is the refractive index along the thickness direction (z-axis), and d is the film thickness.

If any of $R_{th}$ or $R_e$ is much larger than the other, the film can be used as a compensation film having uni-axial optical anisotropy, and if both of them are not close to 0, the film can be used as a compensation film having bi-axial optical anisotropy.

Compensation films having uni-axial optical anisotropy can be classified into the A-plate ($n_x \neq n_y \approx n_z$) and the C-plate ($n_x \approx n_y \neq n_z$). The in-plane phase difference can be controlled by such secondary film processing as precise film stretching, and thus optical isotropic materials can be uni-axial oriented. However, the controlling optical anisotropy along the thickness direction by secondary processing is relatively limited, and it is preferable to use a transparent polymer material having different molecular arrangements along the thickness direction and the planar direction. In particular, when considering compensation along the optical axis only, an ideal compensation film should have an optical axis which is a mirror image of that of the liquid crystal layer, and thus the negative C-plate having negative birefringence along the thickness direction can be required for VA mode and TN mode, which have higher refractive indices along the thickness direction than the planar direction.

Because the negative C-plate has a very small $R_e$ value, $R_{th}$ can be obtained from the following Equation 3 by measuring $R_\theta$, which is expressed by the product of optical path length and $\Delta(n_y - n_\theta)$, the difference of refractive index along the fast axis and refractive index when the angle between the film plane and the incident ray of light is large:

$$R_{th} = \frac{R_\theta \times \cos\theta_f}{\sin^2\theta_f} \quad \text{Equation 3}$$

In Equation 3, $\theta_f$ is the internal angle.

For polymer materials that can be used as the negative C-plate, a discotic liquid crystal (e.g., U.S. Pat. No. 5,583,679), a polyimide having a planar phenyl group at the main chain (e.g., U.S. Pat. No. 5,344,916), and a cellulosic film (e.g., WO 2000/55657) are disclosed.

Of these materials, the discotic liquid crystal cannot be used alone and requires precise coating of up to several micrometers thickness on a transparent support. In addition to the cost of the coating process, the relative large birefringence of the discotic liquid crystal results in a relatively large phase difference as a result of a small difference in coating thickness, and pollutants such as dust remaining on the coating film surface or in the discotic liquid crystal solution may cause optical defects.

The polyimide is problematic because it experiences optical loss as it absorbs light in the visible region, and it peels easily due to weak adhesivity and high water absorptivity.

The cellulose ester-based film has problems in dimensional stability and adhesivity due to high water absorptivity, and is disadvantageous in durability compared with cycloolefin polymers due to the relatively high content of phase retarder compound having a low molecular weight. Also, resins comprising such an aromatic phase retarder compound have a relatively large wavelength dispersive characteristic due to the absorption in the visible region, which is seen from Sellmeyer's formula expressed by the following Equation 4:

$$n^2(\lambda) = 1 + \frac{A_1 \lambda^2}{\lambda^2 - \lambda_1^2} + \frac{A_2 \lambda^2}{\lambda^2 - \lambda_2^2} + \ldots \quad \text{Equation 4}$$

In Equation 4, n is the refractive index, $\lambda_1, \lambda_2, \ldots$ are absorption wavelengths, and $A_1, A_2, \ldots$ are fitting parameters.

Therefore, for a polymer material comprising an aromatic compound that is to be used as a compensation film, compensation of the wavelength dispersive characteristic should be considered because the phase difference varies a lot depending on the wavelength. That is, even if a compensation film comprising such material is optimized for optical compensation near 550 nm, where the highest optical efficiency is obtained, there arises a coloration problem because optical compensation is not satisfied for other wavelengths. This problem makes it difficult to control the display color.

On the contrary, since a cycloolefinic polymer does not absorb light in the visible region, it has a flat wavelength dispersive characteristic, and thus results in small phase differences with respect to wavelength. Cycloolefinic copolymers are well known in the literature. They have low dielectric constants, and low water absorptivity due to high hydrocarbon content.

For methods of polymerizing a cyclic monomer, there are ROMP (ring opening metathesis polymerization), HROMP (ring opening metathesis polymerization followed by hydrogenation), copolymerization with ethylene, and homogeneous polymerization, as seen in the following Scheme 1. Scheme 1 shows polymers having different structures and physical properties that are obtained from the same monomers depending on which polymerization method is applied.

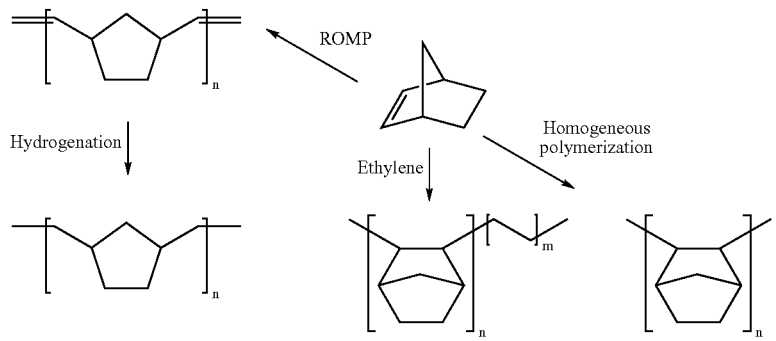

Scheme 1

The polymer obtained by ROMP has poor heat stability and oxidative stability due to unsaturation of the main chain, and is used as a thermoplastic resin or thermosetting resin. But the resin prepared from this method has a heat stability problem. Hydrogenation generally increases the glass transition temperature of the ROMP polymer by some 50° C., but the glass transition temperature is still low due to the ethylene group present between the cyclic monomers (Metcon 99).

In addition, cost increases due to more synthesis steps and weak mechanical properties are barriers to commercial utilization of such polymers. It has been reported that a polymer having a large molecular weight but a narrow molecular weight distribution can be obtained if a zirconium-based metallocene catalyst is used (*Plastic News*, Feb. 27, 1995, p.24). However, the activity decreases as the cyclic monomer concentration increases, and the copolymer has a low glass transition temperature ($T_g$<200° C.). Also, although the heat stability is improved, the mechanical strength is weak and chemical resistance against solvents or halogenated hydrocarbons is not good.

A cycloolefinic polymer obtained by addition polymerization using a homogeneous catalyst has a rigid and bulky ring structure in every monomer unit of the main chain. Thus, the polymer has very high $T_g$, and is amorphous. Therefore, the polymer neither experiences optical loss due to scattering nor absorbs light in the visible region by π-conjugation. Particularly, a cycloolefinic polymer having a relatively large molecular weight, which is obtained by addition polymerization using an organometallic compound as a catalyst, is electrically isotropic and has a low dielectric constant (*J. Appl. Polym. Sci.* Vol. 80, p 2328, 2001).

Thus, polymers prepared using norbornene monomers have high transmittivity, low birefringence, and high $T_g$, so they can be used for optical purposes such as in light guide panels and optical discs. Also, due to low dielectric constants, superior adhesivity, electrical isotropy, and high $T_g$, they can be used as insulation materials.

Introduction of substituents to a polymer comprising hydrocarbons is a useful method to control chemical and physical properties of the polymer. However, when introducing a substituent having a polar functional group, a free electron pair of the polar functional group tends to react with the active catalytic site and functions as a catalyst poison. Therefore, it is not always easy to introduce a polar functional group to a polymer, and there is a limit to the kind and amount of substituents that can be introduced. It is known that polymers prepared from substituted cyclic monomers have small molecular weights. In general, norbornene-based polymers are prepared by using post-transition organometallic catalysts. Most of such catalysts show low activity in polymerization of monomers containing polar groups, and generally, the prepared polymers have molecular weights of not more than 10,000 (Risse et al., *Macromolecules*, 1996, Vol. 29, 2755-2763; Risse et al., *Makromol. Chem.*, 1992, Vol. 193, 2915-2927; Sen et al., *Organometallics* 2001, Vol 20, 2802-2812; Goodall et al., U.S. Pat. No. 5,705,503).

SUMMARY OF THE INVENTION

An object of the present invention is to solve the problems described above and to provide an optical anisotropic film comprising a cycloolefinic polymer having negative birefringence along the thickness direction, which requires no coating process and experiences no optical loss due to light absorption in the visible region.

Another object of the present invention is to provide a method for preparing an optical anisotropic film, a birefringence of which along the thickness direction can be controlled by the kind and content of a functional group introduced to the cycloolefin.

Still another object of the present invention is to provide an optical anisotropic film having superior water absorption resistance and durability and small birefringence difference with respect to wavelength, and a method for preparing the same.

Still another object of the present invention is to provide a liquid crystal display comprising an optical compensation film comprising a cycloolefinic polymer having negative birefringence along the thickness direction, which requires no coating process and experiences no optical loss due to light absorption in the visible region.

To attain the objects, the present invention provides a negative C-plate type optical anisotropic film comprising a polycycloolefin.

The present invention also provides an optically anisotropic transparent film with a retardation value ($R_{th}$) defined by the following Equation 1 being 30 to 1000 nm, and a phase difference ratio for two wavelengths at a given declined angle being ($R_{450}/R_{550}$)=1 to 1.05 and ($R_{650}/R_{550}$)=0.95 to 1, respectively, wherein $R_{450}$ is the phase difference at wavelength=450 nm, $R_{550}$ is the phase difference at wavelength=550 nm, and $R_{650}$ is the phase difference at wavelength=650 nm:

$$R_{th}=\Delta(n_y-n_z)\times d \qquad \text{Equation 1}$$

In Equation 1, $n_y$ is the in-plane refractive index along the transverse direction or along the fast axis measured at the wavelength of 550 nm;

$n_z$ is the refractive index along the thickness direction (z-axis) measured at the wavelength of 550 nm; and d is the film thickness.

The present invention also provides an optical anisotropic compensation film comprising a polycycloolefin for use in a liquid crystal display.

Further, the present invention provides a method for preparing a negative C-plate type optical anisotropic film comprising a polycycloolefin, which comprises the steps of:

a) addition polymerizing norbornene-based monomers to prepare a norbornene-based addition polymer;

b) dissolving said norbornene-based addition polymer in a solvent to prepare a norbornene-based addition polymer solution; and c) coating or casting said norbornene-based addition polymer solution on a plate and drying the same.

Further, the present invention provides a liquid crystal display comprising a negative C-plate type optical anisotropic film comprising a polycycloolefin.

DETAILED DESCRIPTION OF THE PREFERRED EMBODIMENTS

Hereinafter, the present invention is described in more detail.

The present invention provides a negative C-plate type optical anisotropic film, particularly a film comprising a cycloolefin addition polymer prepared from addition polymerization of a norbornene-based monomer, a method for preparing the same, and a liquid crystal display comprising the same.

The cycloolefin addition polymer of the present invention, which is prepared from addition polymerization of a norbornene-based monomer, includes a homopolymer prepared from addition polymerization of norbornene-based monomers represented by the following Chemical Formula 1, and a copolymer prepared from addition copolymerization with another monomer:

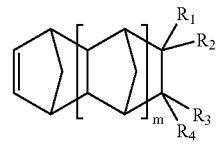

Chemical Formula 1

In Chemical Formula 1, m is an integer from 0 to 4;

$R_1$, $R_2$, $R_3$, and $R_4$ are independently or simultaneously hydrogen; a halogen; a $C_1$ to $C_{20}$ linear or branched alkyl, alkenyl, or vinyl; a $C_4$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; a $C_3$ to $C_{20}$ alkynyl; a $C_1$ to $C_{20}$ linear or branched haloalkyl, haloalkenyl, or halovinyl; a $C_5$ to $C_{12}$ halocycloalkyl substituted by a hydrocarbon or unsubstituted; a $C_6$ to $C_{40}$ haloaryl substituted by a hydrocarbon or unsubstituted; a $C_7$ to $C_{15}$ haloaralkyl substituted by a hydrocarbon or unsubstituted; a $C_3$ to $C_{20}$ haloalkynyl; or a non-hydrocarbonaceous polar group containing at least one of oxygen, nitrogen, phosphorus, sulfur, silicon, or boron; and if $R_1$, $R_2$, $R_3$, and $R_4$ are not hydrogen, a halogen, or a polar functional group, $R_1$ and $R_2$, or $R_3$ and $R_4$ may be connected to each other to form a $C_1$ to $C_{10}$ alkylidene group, or $R_1$ or $R_2$ may be connected to $R_3$ or $R_4$ to form a $C_4$ to $C_{12}$ saturated or unsaturated cyclic group or a $C_6$ to $C_{24}$ aromatic cyclic compound.

Said non-hydrocarbonaceous polar group can be selected from the following functional groups, but is not limited to them:

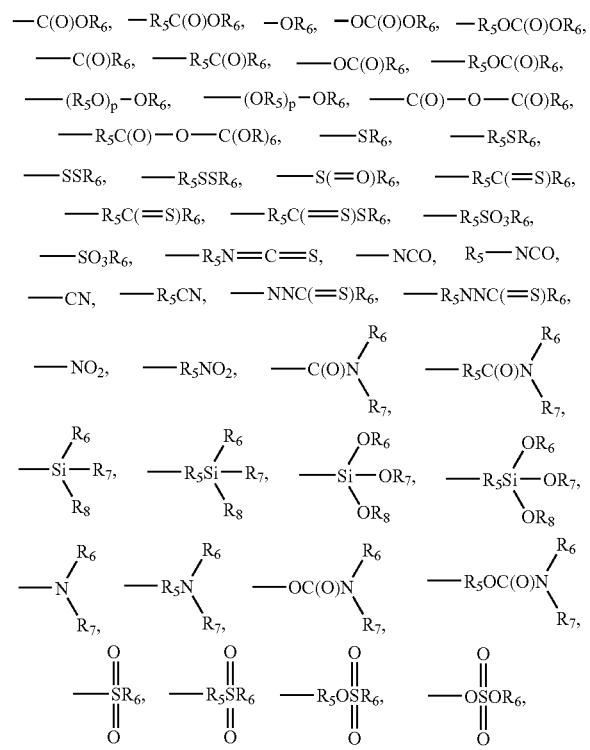

-continued

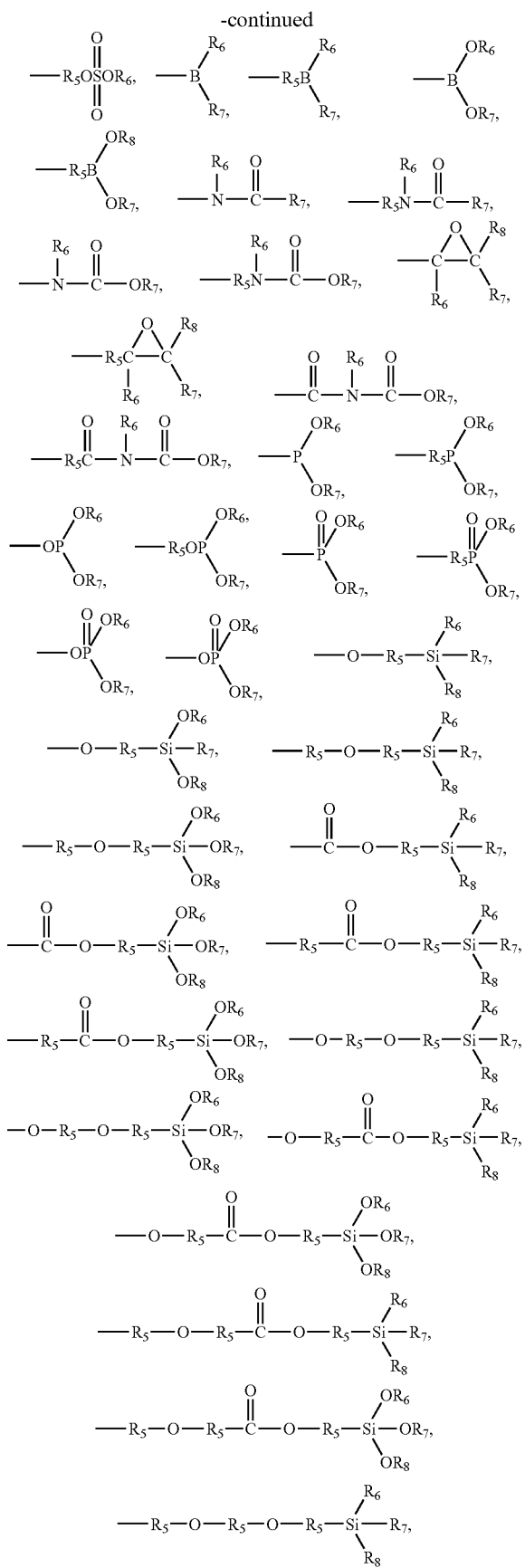
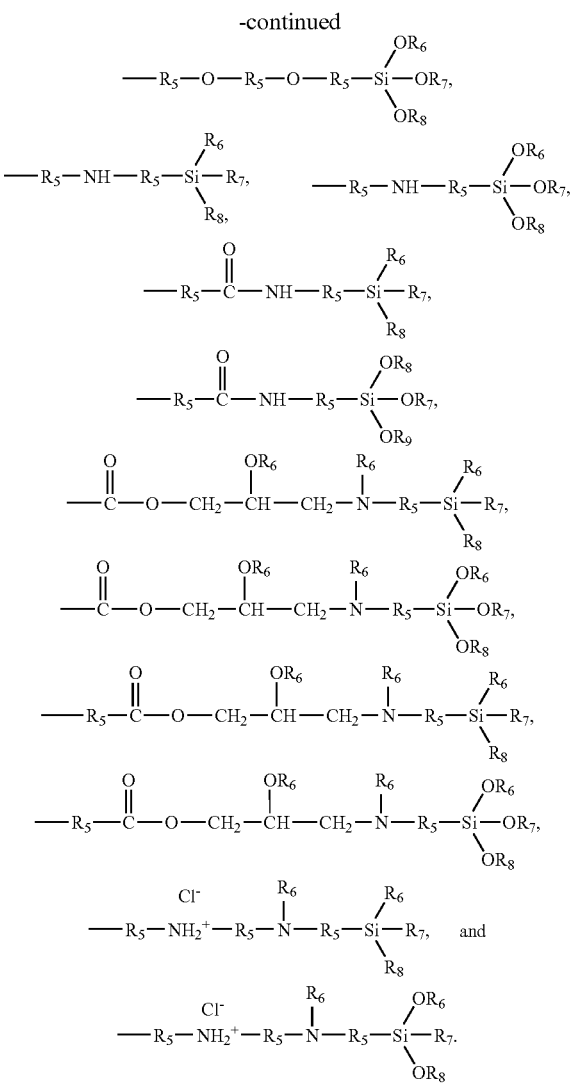

Each $R_5$ of said non-hydrocarbonaceous polar group is a $C_1$ to $C_{20}$ linear or branched alkyl, haloalkyl, alkenyl, haloalkenyl, vinyl, or halovinyl; a $C_4$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_7$ to $C_{15}$ aralkyl or haloaralkyl substituted by a hydrocarbon or unsubstituted; or a $C_3$ to $C_{20}$ alkynyl or haloalkynyl;

each of $R_6$, $R_7$, and $R_8$ is hydrogen; a halogen; a $C_1$ to $C_{20}$ linear or branched alkyl, haloalkyl, alkenyl, haloalkenyl, vinyl, halovinyl, alkoxy, haloalkoxy, carbonyloxy, or halocarbonyloxy; a $C_4$ to $C_{12}$ cycloalkyl or halocycloalkyl substituted by a hydrocarbon or unsubstituted; a $C_6$ to $C_{40}$ aryl, haloaryl, aryloxy, or haloaryloxy substituted by a hydrocarbon or unsubstituted; a $C_7$ to $C_{15}$ aralkyl or haloaralkyl substituted by hydrocarbon or unsubstituted; or $C_3$ to $C_{20}$ alkynyl or haloalkynyl; and p is an integer from 1 to 10.

The norbornene-based monomer of the present invention is a monomer comprising at least one norbornene(bicyclo[2,2,1]hept-2-ene) unit represented by the following Chemical Formula 2:

Chemical Formula 2

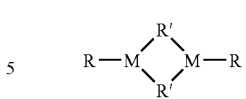

Chemical Formula 4

The negative C-plate type optical anisotropic film of the present invention can be prepared from any cycloolefinic polymer obtained from addition polymerization of a norbornene-based monomer. A variety of cycloolefinic polymers can be obtained depending on which catalyst system is selected during the addition polymerization. For example, a homopolymer of norbornene-based monomers containing nonpolar functional groups, a copolymer of norbornene-based monomers containing different nonpolar functional groups, a homopolymer of norbornene-based monomers containing polar functional groups, a copolymer of norbornene-based monomers containing different polar functional groups, or a copolymer of norbornene-based monomers containing nonpolar functional groups and norbornene-based monomers containing polar functional groups can be prepared. In particular, it is preferable that the norbornene-based polymer preferably contains polar groups and has a number-average molecular weight at least 10,000. As in common polymerization, the addition polymerization is performed by mixing monomers and a catalyst in a solvent.

These cycloolefinic polymers may contain any polar group regardless of the catalyst system. By changing the kind and content of the polar functional groups or nonpolar functional groups, the optical anisotropy of the polymers can be altered. The resultant polymers can be used in compensation films for LCDs.

A polycycloolefin containing polar groups can be prepared by a variety of methods. Particularly, it is preferable to obtain it from addition polymerization of norbornene-based monomers in the presence of a group 10 transition metal catalyst.

More preferably, a catalyst system comprising a group 10 transition metal compound catalyst, an organic compound cocatalyst comprising a group 15 element which has lone pair electrons that function as electron donors, and a salt cocatalyst comprising a group 13 element which can be weakly coordinated to said transition metal, are contacted with norbornene-based monomers represented by Chemical Formula 1 to prepare polar group-substituted cycloolefinic polymers having large molecular weights with a high yield.

When preparing a cycloolefinic polymer containing such polar groups as ester groups or acetyl groups, it is preferable to contact a catalyst system comprising:

i) a group 10 transition metal compound;

ii) a compound comprising a neutral group 15 electron donor ligand, a cone angle of which is at least 160°; and iii) a salt capable of offering an anion which can be weakly coordinated to said transition metal of i)

with norbornene-based monomers represented by Chemical Formula 1, which contain such polar functional groups as ester groups or acetyl groups. However, cycloolefinic polymers containing polar functional groups and method for preparing the same are not limited to the aforementioned.

Preferably, the group 10 transition metal of i) is a compound represented by the following Chemical Formula 3 or Chemical Formula 4:

M(R)(R')   Chemical Formula 3

In Chemical Formula 3 and Chemical Formula 4,

M is a group 10 metal; and each of R and R' is an anion-leaving group that can be easily removed by an weakly coordinating anion, which can be selected from the group consisting of a hydrocarbyl, a halogen, a nitrate, an acetate, trifluoromethanesulfonate, bis-trifluoromethanesulfonimide, tosylate, a carboxylate, an acetylacetonate, a carbonate, an aluminate, a borate, an anti-monate such as $SbF_6^-$, an arsenate such as $AsF_6^-$, a phosphate such as $PF_6^-$ or $PO_4^-$, a perchlorate such as $ClO_4^-$, an amide such as $(R'')_2N$, and a phosphide such as $(R'')_2P$, wherein said hydrocarbyl anion can be selected from the group consisting of: a hydride; a $C_1$ to $C_{20}$ linear or branched alkyl, haloalkyl, alkenyl, haloalkenyl, vinyl, or halovinyl; a $C_5$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_6$ to $C_{40}$ aryl or haloaryl containing a hetero atom; a $C_7$ to $C_{15}$ aralkyl or haloaralkyl substituted by a hydrocarbon or unsubstituted; and a $C_3$ to $C_{20}$ alkynyl or haloalkynyl, said acetate and acetylacetonate are $[R'''C(O)O]^-$ and $[R'''C(O)CHC(O)R'''']^-$ respectively, which are anionic ligands offering an σ-bond or π-bond, and each of R'', R''', and R'''' is hydrogen; a halogen; a $C_1$ to $C_{20}$ linear or branched alkyl, haloalkyl, alkenyl, haloalkenyl, vinyl, or halovinyl; a $C_5$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_6$ to $C_{40}$ aryl or haloaryl containing a hetero atom; a $C_7$ to $C_{15}$ aralkyl or haloaralkyl substituted by a hydrocarbon or unsubstituted; or a $C_3$ to $C_{20}$ alkynyl or haloalkynyl.

Preferably, the compound comprising a neutral group 15 electron donor ligand, a cone angle of which is at least 160°, of ii), is a compound represented by the following Chemical Formula 5 or Chemical Formula 6:

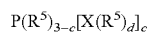   Chemical Formula 5

In Chemical Formula 5,

X is oxygen, sulfur, silicon, or nitrogen;

c is an integer from 0 to 3;

wherein if X is oxygen or sulfur, d is 1, if X is silicon, d is 3, and if X is nitrogen, d is 2, and if c is 3 and X is oxygen, two or three $R^5$s may be connected with oxygen to form a cyclic group; and if c is 0, two $R^5$s may be connected with each other to form a phosphacycle; and each $R^5$ is hydrogen; a $C_1$ to $C_{20}$ linear or branched alkyl, alkoxy, allyl, alkenyl, or vinyl; a $C_5$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; a $C_3$ to $C_{20}$ alkynyl; a tri($C_1$ to $C_{10}$ linear or branched alkyl)silyl; a tri($C_1$ to $C_{10}$ linear or branched alkoxy)silyl; a tri($C_5$ to $C_{12}$ cycloalkyl substituted by a hydrocarbon or unsubstituted) silyl; a tri($C_6$ to $C_{40}$ aryl substituted by a hydrocarbon or unsubstituted)silyl; a tri($C_6$ to $C_{40}$ aryloxy substituted by a hydrocarbon or unsubstituted)silyl; a tri($C_1$ to $C_{10}$ linear or branched alkyl)siloxy; a tri($C_5$ to $C_{12}$ cycloalkyl substituted by a hydrocarbon or unsubstituted)siloxy; or a tri($C_6$ to $C_{40}$ aryl substituted by a hydrocarbon or unsubstituted)siloxy;

wherein each functional group can be substituted by a linear or branched haloalkyl, or a halogen.

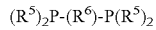  Chemical Formula 6

In Chemical Formula 6, $R^5$ is the same as defined in Chemical Formula 5; and $R^6$ is a $C_1$ to $C_5$ linear or branched alkyl, alkenyl, or vinyl; a $C_5$ to $C_{12}$ cycloalkyl substituted by a hydrocarbon or unsubstituted; a $C_6$ to $C_{20}$ aryl substituted by a hydrocarbon or unsubstituted; or a $C_7$ to $C_{15}$ aralkyl substituted by a hydrocarbon or unsubstituted.

Also, preferably, the salt of iii) capable of offering an anion which can be weakly coordinated to said transition metal of i) is a salt represented by the following Chemical Formula 7:

  Chemical Formula 7

In Chemical Formula 7,

Cat is a cation selected from the group consisting of hydrogen; a cation of a group 1 metal, a group 2 metal, or a transition metal; and an organic group comprising said cations, to which the neutral group 15 electron donor compound of ii) can be bonded;

Anion is an anion that can be weakly coordinated to the metal M of the compound represented by Chemical Formula 3, which is selected from the group consisting of borate, aluminate, $SbF_6^-$, $PF_6^-$, $AlF_3O_3SCF_3^-$, $SbF_5SO_3F^-$, $AsF_6^-$, perfluoroacetate ($CF_3CO_2^-$), perfluoropropionate ($C_2F_5CO_2^-$), perfluorobutyrate ($CF_3CF_2CF_2CO_2^-$), perchlorate ($ClO_4^-$), p-toluenesulfonate (p-$CH_3C_6H_4SO_3^-$), $SO_3CF_3^-$, boratabenzene, and caborane substituted by halogen or unsubstituted; and a and b are number of cations and anions, respectively, and are determined so that electrical neutrality is obtained.

Preferably, the cation-containing organic group in Chemical Formula 7 is selected from the group consisting of ammonium ($[NH(R^7)_3]^+$ or $[N(R^7)_4]^+$); phosphonium ($[PH(R^7)_3]^+$ or $[P(R^7)_4]^+$); carbonium ($[C(R^7)_3]^+$); silyliuin ($[Si(R^7)_3]+$); $[Ag]^+$; $[Cp2Fe]^+$; and $[H(OEt_2)_2]^+$, wherein each $R^7$ is a $C_1$ to $C_{20}$ linear or branched alkyl; an alkyl or silylalkyl substituted by a halogen; a $C_5$ to $C_{12}$ cycloalkyl substituted by a hydrocarbon or unsubstituted; a cycloalkyl or silylcycloalkyl substituted by a halogen; a $C_6$ to $C_{40}$ aryl substituted by a hydrocarbon or unsubstituted; an aryl or silylaryl substituted by a halogen; a $C_7$ to $C_{15}$ aralkyl substituted by a hydrocarbon or unsubstituted; or an aralkyl or silyl aralkyl substituted by a halogen.

Also, preferably, the borate and alumninate in Chemical Formulas 3, 4, and 7 are anions represented by the following Chemical Formula 8 or Chemical Formula 9:

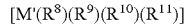  Chemical Formula 8

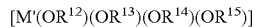  Chemical Formula 9

In Chemical Formula 8 and Chemical Formula 9,

M' is boron or aluminum; and each of $R^8$, $R^9$, $R^{10}$, $R^{11}$, $R^{12}$, $R^{13}$, $R^{14}$, and $R^{15}$ is a halogen; a $C_1$ to $C_{20}$ linear or branched alkyl or alkenyl substituted by a halogen or unsubstituted; a $C_5$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; a $C_3$ to $C_{20}$ alkynyl; a $C_3$ to $C_{20}$ linear or branched trialkylsiloxy; or a $C_{18}$ to $C_{48}$ linear or branched triarylsiloxy.

The catalyst system of the present invention is a highly active catalyst system capable of avoiding a catalytic activity decrease by an endo ester group or acetyl group. It makes it easy to prepare a polycycloolefin having such polar groups as ester groups or acetyl groups.

A polycycloolefin, which is used to prepare the negative C-plate type optical anisotropic film of the present invention, experiences no optical loss due to light absorption in the visible region, has relatively low water absorptivity, has a higher surface tension when a polar functional group is introduced than when only nonpolar functional groups are present, and has superior adhesivity to polyvinyl alcohol (PVA) film and metal.

In the optical anisotropic film of the present invention, it is preferable to introduce a functional group such as an ester group or acetyl group to the norbornene-based monomer represented by Chemical Formula 1 to increase the negative birefringence along the thickness direction. Other than an ester group and acetyl group, functional groups such as an alkoxy group, an amino group, a hydroxyl group, a carbonyl group, and a halogen-containing group can be introduced, but the functional groups are not limited to the aforementioned. As seen in Examples, the refractive index and $R_{th}$ value can be controlled by changing the kind and content of the functional group introduced to norbornene.

In general, to obtain a large $R_{th}$ value, a cycloolefin having a large m of Chemical Formula 1 is introduced, the content of polar functional groups is increased, the length of substituents is reduced by reducing the number of carbons present in $R_1$, $R_2$, $R_3$, $R_4$, and $R_5$, highly polar functional groups are introduced, or a cycloolefin wherein $R_1$ or $R_2$ is connected with $R_3$ or $R_4$ to form a $C_6$ to $C_{24}$ aromatic cyclic compound is introduced.

The negative C-plate type optical anisotropic film of the present invention is prepared in film or sheet form through solution casting, by dissolving said polycycloolefin in a solvent.

The film is prepared from a homopolymer of norbornene-based monomers containing nonpolar functional groups, a copolymer of norbornene-based monomers containing different nonpolar functional groups, a homopolymer of norbornene-based monomers containing polar functional groups, a copolymer of norbornene-based monomers containing different polar functional groups, or a copolymer of norbornene-based monomers containing nonpolar functional groups and norbornene-based monomers containing polar functional groups. Also, the film can be prepared from blends which can be composed of one or more of these polycycloolefin polymers.

For the organic solvent used in solution casting, one that offers appropriate viscosity when a polycycloolefin has been dissolved is preferable. More preferably, the solvent is selected from the group consisting of an ether having 3 to 12 carbon atoms, a ketone having 3 to 12 carbon atoms, an ester having 3 to 12 carbon atoms, a halogenated hydrocarbon having 1 to 6 carbon atoms, and an aromatic compound. Said ether, ketone, or ester compound may have a ring structure. In addition, compounds having more than one ether, ketone, or ester functional groups and compounds having a functional group and a halogen atom can be used.

For said ether having 3 to 12 carbon atoms, there are diisopropyl ether, dimethoxymethane, tetrahydrofuran, etc. For said ester having 3 to 12 carbon atoms, there are ethyl formate, propyl formate, pentyl formate, methyl acetate, ethyl acetate, propyl acetate, isopropyl acetate, isobutyl acetate, pentyl acetate, etc. Preferably, said halogenated hydrocarbon has 1 to 4 carbon atoms, and more preferably one carbon atom. A preferred examples of said halogenated hydrocarbon is methylene chloride having a chlorine atom. For said aromatic compound, there are benzene, toluene, chlorobenzene, etc.

In preparing a film through the solution casting method by dissolving a polycycloolefin in a solvent, it is preferable to add 5 to 95 wt %, more preferably 10 to 60 wt %, of a polycycloolefin of the polymer weight in a solvent, and stir the solution at room temperature. It is preferable that the viscosity of the solution is 100 to 20,000 cps, more preferably 300 to 10,000 cps. To improve mechanical strength, heat resistance, optical resistance, and maintainability of the film, such additives as a plasticizer, an antideteriorant, a UV stabilizer, and an antistatic agent can be added.

For said plasticizer, carboxylic acid esters such as dimethyl phthalate (DMP), diethyl phthalate (DEP), dibutyl phthalate (DBP), dioctyl phthalate (DOP), diphenyl phthalate (DPP), and diethylhexyl phthalate (DEHP), or phosphoric acid esters such as triphenyl phosphate (TPP) and tricresyl phosphate (TCP) may be used. If too much low-molecular-weight plasticizer is used, it may spread to the film surface and therefore reduce the durability of the film. Therefore, the plasticizer is used in an appropriate level (e.g. 0.1 to 20 wt %). A polycycloolefin with a higher glass transition temperature requires a larger plasticizer content.

For said antideteriorant, it is preferable to use phenolic derivatives or aromatic amines. The antideteriorant content is determined so that optical properties, mechanical properties, and durability of the film are not affected.

Examples of phenolic antideteriorants are octadecyl-3-(4-hydroxy-3,5-di-tert-butylphenyl) propionate (Irganox 1076 of Ciba-Geigy), tetrabis[methylene-3-(3,5-di-tert-butyl4-hydroxyphenyl) propionate methane (Irganox 1010 of Ciba-Geigy), 1,3,5-trimethyl-2,4,6-tris-(3,5-di-tert-butyl-4-hydroxybenzyl) benzene (Irganox 1330 of Ciba-Geigy), and tris-(3,5-di-tert-butyl-4-hydroxybenzyl)isoamine (Irganox 3114 of Ciba-Geigy).

Examples of aromatic amine antideteriorants are phenyl-α-naphtylamine, phenyl-β-naphtylamine, N,N'-diphenyl-p-phenylenediamine, and N,N'-di-β-naphtyl-p-phenylenediamine.

The antideteriorant may be used along with such peroxide decomposers as a phosphite compound or a sulfide compound. An example of the phosphite peroxide decomposers is tris(2,4-di-tert-butylphenyl)phosphite (Irgafos 168 of Ciba-Geigy), and examples of sulfide peroxide decomposers are dilauryl sulfide, dilauryl thiodipropionate, distearyl thiodipropionate, mercaptobenzothioazole, and tetramethylthiuram disulfide.

For said UV stabilizer, it is preferable to use benzophenone, salicylate, or benzotria compounds. Examples of benzophenone UV stabilizers are 2-hydroxy-4-otoxybenzophenone and 2,2'-dihydroxy-4,4'-dioctoxy benzophenone; an example of salicylate UV stabilizers is p-octyl phenyl salicylate; and an example of benzotria UV stabilizers is 2-(2'-hydroxy-5'-methylphenyl) benzophenone.

For said antistatic agent, any antistatic agent miscible with the polynorbornene solution can be used. Preferably, the antistatic agent has a surface specific resistance equal to or lower than $10^{10}\Omega$. Non-ionic, anionic, or cationic antistatic agents can be used.

Examples of non-ionic antistatic agents are polyoxy ethylene alkyl ether, polyoxy ethylene alkyl phenol ether, polyoxy ethylene alkyl ester, polyoxy ethylene stearyl amine, and polyoxy ethylene alkyl amine.

Examples of anionic antistatic agents are sulfuric acid ester salt, alkyl allyl sulfonate, aliphatic amide sulfonate, and phosphoric acid ester salt.

Examples of cationic antistatic agents are aliphatic amine salt, alkyl pyridinium salt, imidazoline derivative, betaine alkyl amino derivative, sulfuric acid ester derivative, and phosphoric acid ester derivative.

Besides the aforementioned, ionic polymer compounds, such as an anionic polymer compound disclosed in Japan Patent Publication No. Sho 49-23828; an ionene-type compound having dissociated groups in the main chain as disclosed in Japan Patent Publication No. Sho 55-734, Japan Patent Publication No. Sho 59-14735, and Japan Patent Publication No. Sho 57-18175; a cationic polymer compound disclosed in Japan Patent Publication No. Sho 53-13223; and a graft copolymer disclosed in Japan Patent Publication No. Hei 5-230161, can be used as antistatic agent.

After casting or coating the polycycloolefin solution of the present invention on a polished band, drum, or glass plate, the solvent is dried to obtain an optical film or sheet. The solvent drying temperature is selected depending on what solvent is used. For polished metal or glass plate, a surface temperature lower than room temperature is preferable. After the solvent is fully dried, the formed film or sheet is peeled from the metal or glass plate.

Such prepared optical film of the present invention is an optically anisotropic transparent film having a retardation value ($R_{th}$) defined by Equation 1 in the range of 30 to 1000 nm.

Preferably, when the film thickness ranges from 30 to 200 μm, the $R_{th}$, value ranges from 30 to 1000 nm. More preferably, when the film thickness ranges from 50 to 120 μm, the $R_{th}$ value ranges from 50 to 600 nm. Because this film is highly transparent, at least 90% of light in the range of 400 to 800 nin is transmitted, and the phase difference ratios at two wavelengths at a given declined angle, ($R_{450}/R_{550}$) and ($R_{650}/R_{550}$), are at most 1.05 and at least 0.95, respectively. Therefore, it has flat wavelength dispersive characteristic. Here, $R_{450}$ is the phase difference at 450 nm, $R_{550}$ is the phase difference at wavelength 550 nm, and $R_{650}$ is the phase difference at 650 nm. Such a flat wavelength dispersive characteristic can be altered by blending or introduction of functional groups into the polymer, if necessary. In fact, the phase difference ratios at two wavelengths are ($R_{450}/R_{550}$)=1 to 1.05, and ($R_{650}/R_{550}$)=0.95 to 1.

Since the optical film comprising a polycycloolefin of the present invention is optically anisotropic and has very superior adhesivity to such materials as polyvinyl alcohol (PVA), it can be attached to a PVA polarizing film, etc. Also, when it is treated by corona discharge, glow discharge, flame, acid, alkali, UV radiation, or coating, its properties such as transparency and anisotropy are not deteriorated.

The optical anisotropic film of the present invention has refractive indices satisfying the relationship of the following Equation 5:

$$n_x \approx n_y > n_z \qquad \text{Equation 5}$$

($n_x$=refractive index along the slow axis, $n_y$=refractive index along the fast axis, $n_z$=refractive index along the thickness direction)

Additionally, the optical anisotropic film comprising a polycycloolefin of the present invention can offer fine image quality at a wide view angle and improve brightness during ON/OFF of the driving cell, when used for a liquid crystal display. In particular, when the voltage is applied ON or OFF state, refractive indices of the liquid crystal layer satisfy the relationship expressed by the following Equation 6, and thus enables optical compensation of the liquid crystal mode liquid crystal display:

$$n_x \approx n_y < n_z \quad \text{Equation 6}$$

($n_x$=refractive index along the slow axis, $n_y$=refractive index along the fast axis, $n_z$=refractive index along the thickness direction)

Hereinafter, the present invention is described in more detail through Examples and Comparative Examples. However, the following Examples are only for the understanding of the present invention, and the present invention is not limited by the following Examples.

EXAMPLES

Preparation Example 1

Polymerization of Norbornene Carboxylic Acid Methyl Ester

A norbornene carboxylic acid methyl ester monomer and purified toluene were added to a polymerization reactor in a 1:1 weight ratio.

0.01 mol % (for the monomer content) of Pd(acac)$_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 80° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid methyl ester polymer (PMeNB).

Preparation Example 2

Polymerization of Norbornene Carboxylic Acid Butyl Ester

A norbornene carboxylic acid butyl ester norbornene monomer and purified toluene were added to a polymerization reactor in a 1:1 weight ratio.

0.01 mol % (for the monomer content) of Pd(acac)$_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 80° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid butyl ester polymer (PBeNB).

Preparation Example 3

Copolymerization of Norbornene Carboxylic Acid Butyl Ester-Norbornene Carboxylic Acid Methyl Ester (Norbornene Carboxylic Acid Butyl Ester/Norbornene Carboxylic Acid Methyl Ester=7/3)

A 3:7 molar ratio of norbornene carboxylic acid methyl ester and norbornene carboxylic acid butyl ester were added to a polymerization reactor as monomers. Then, purified toluene was added in a 1:1 (for the total monomer content) weight ratio.

0.01 mol % (for the monomer content) of Pd(acac)$_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 80° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid butyl ester/norbornene carboxylic acid methyl ester (7:3) copolymer (PBe-7-Me-3-NB).

Preparation Example 4

Copolymerization of Norbornene Carboxylic Acid Butyl Ester-Norbornene Carboxylic Acid Methyl Ester (Norbornene Carboxylic Acid Butyl Ester/Norbornene Carboxylic Acid Methyl Ester=5/5)

A 5:5 molar ratio of norbornene carboxylic acid methyl ester and norbornene carboxylic acid butyl ester were added to a polymerization reactor as monomers. Then, purified toluene was added in a 1:1 (for the total monomer content) weight ratio.

0.01 mol % (for the monomer content) of Pd(acac)$_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 80° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid methyl ester/norbornene carboxylic acid butyl ester (5:5) copolymer (PBe-5-Me-5-NB).

Preparation Example 5

Copolymerization of Norbornene Carboxylic Acid Butyl Ester-Norbornene Carboxylic Acid Methyl Ester (Norbornene Carboxylic Acid Butyl Ester/Norbornene Carboxylic Acid Methyl Ester=3/7)

A 3:7 molar ratio of norbornene carboxylic acid butyl ester and norbornene carboxylic acid methyl ester were added to a polymerization reactor as monomers. Then, purified toluene was added in a 1:1 (for the total monomer content) weight ratio.

0.01 mol % (for the monomer content) of Pd(acac)$_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 80° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid butyl ester/norbornene carboxylic acid methyl ester (3:7) copolymer (PBe-3-Me-7-NB).

Preparation Example 6

Copolymerization of Norbornene Carboxylic Acid Methyl Ester-Butyl Norbornene (Norbornene Carboxylic Acid Methyl Ester/Butyl Norbornene=317)

A 3:7 molar ratio of norbornene carboxylic acid methyl ester and butyl norbornene were added to a polymerization reactor as monomers. Then, purified toluene was added in a 1:1 (for the total monomer content) weight ratio.

0.01 mol % (for the monomer content) of $Pd(acac)_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 90° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid methyl ester/butyl norbornene (3:7) copolymer (PBu-7-Me-3-NB).

Preparation Example 7

Copolymerization of Norbornene Carboxylic Acid Methyl Ester-Butyl Norbornene (Norbornene Carboxylic Acid Methyl Ester/Butyl Norbornene=5/5)

A 5:5 molar ratio of norbornene carboxylic acid methyl ester and butyl norbornene were added to a polymerization reactor as monomers. Then, purified toluene was added in a 1:1 (for the total monomer content) weight ratio.

0.01 mol % (for the monomer content) of $Pd(acac)_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 18 hours while stirring at 90° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid methyl ester/butyl norbornene (5:5) copolymer (PBu-5-Me-5-NB).

Preparation Example 8

Copolymerization of Norbornene Carboxylic Acid Methyl Ester-Butyl Norbornene (Norbornene Carboxylic Acid Methyl Ester/Butyl Norbornene=7/3)

A 7:3 molar ratio of norbornene carboxylic acid methyl ester and butyl norbornene were added to a polymerization reactor as monomers. Then, purified toluene was added in a 1:1 (for the total monomer content) weight ratio.

0.01 mol % (for the monomer content) of $Pd(acac)_2$ dissolved in toluene and 0.01 mol % (for the monomer content) of tricyclohexylphosphine, as catalysts, and 0.02 mol % (for the monomer content) of dimethylanilinium tetrakis(pentafluorophenyl)borate dissolved in $CH_2Cl_2$, as a cocatalyst, were added to the reactor. Reaction was carried out for 20 hours while stirring at 90° C.

After the reaction was completed, the reaction mixture was added to excess ethanol to obtain a white copolymer precipitate. The precipitate was filtered with a glass funnel, and the collected copolymer was dried in a vacuum oven for 24 hours at 65° C. to obtain a norbornene carboxylic acid methyl ester/butyl norbornene (7:3) copolymer (PBu-3-Me-7-NB).

Preparation Example 9

Polymerization of Butyl Norbornene

A butyl norbornene monomer and purified toluene were added to a polymerization reactor in a 1:1 weight ratio.

0.025 mol % (for the monomer content) of Ni(ethylhexanoate) dissolved in methylene chloride, as a catalyst, and 0.225 mol % (for the monomer content) of tris(pentafluorophenyl)boron and 0.25 mol % (for the monomer content) of triethylaluminum dissolved in toluene, as cocatalysts, were added to the reactor. Reaction was carried out for 20 hours while stirring at room temperature.

After the reaction was completed, the reaction mixture was added to a methylene chloride solution after dissolving a small amount of hydroxyquinoline therein. After stirring for 18 hours, the solution was added to excess ethanol to obtain a white copolymer precipitate. The precipitate was filtered with a glass funnel, and the collected copolymer was dried in a vacuum oven for 24 hours at 80° C. to obtain a butyl norbornene polymer (PBuNB).

Preparation Example 10

Polymerization of Octyl Norbornene-Norbornene Copolymer (Octyl Norbornene/Norbornene=8/2)

An 8:2 molar ratio of octyl norbornene and norbornene were added to a polymerization reactor as monomers. Then, purified toluene was added in a 1:1 (for the total monomer content) weight ratio.

0.025 mol % (for the monomer content) of Ni(ethylhexanoate) dissolved in toluene, as a catalyst, and 0.225 mol % (for the monomer content) of tris(pentafluorophenyl)boron and 0.25 mol % (for the monomer content) of triethylaluminum dissolved in toluene, as cocatalysts, were added to the reactor. Reaction was carried out for 20 hours while stirring at room temperature.

After the reaction was completed, the reaction mixture was added to a methylene chloride solution after dissolving a small amount of hydroxyquinoline therein. After stirring for 12 hours, the solution was added to excess ethanol to obtain a white copolymer precipitate. The precipitate was filtered with a glass funnel, and the collected copolymer was dried in a vacuum oven for 24 hours at 80° C. to obtain a octylnorbornene/norbornene (8:2) copolymer (POc-8-NB-2).

Preparation Example 11

Polymerization of Decyl Norbornene-Norbornene Copolymer (Decyl Norbornene/Norbornene=7:3)

A 7:3 molar ratio of decyl norbornene and norbornene were added to a polymerization reactor as monomers. Then, purified toluene was added in a 1:1 (for the total monomer content) weight ratio.

0.025 mol % (for the monomer content) of Ni(ethylhexanoate) dissolved in toluene, as a catalyst, and 0.225 mol % (for the monomer content) of tris(pentafluorophenyl)boron and 0.25 mol % (for the monomer content) of triethylaluminum dissolved in toluene, as cocatalysts, were added to the reactor. Reaction was carried out for 17 hours while stirring at room temperature.

After the reaction was completed, the reaction mixture was added to a methylene chloride solution after dissolving a small amount of hydroxyquinoline therein. After stirring for 12 hours, the solution was added to excess ethanol to obtain a white copolymer precipitate. The precipitate was filtered with a glass funnel, and the collected copolymer was dried in a vacuum oven for 24 hours at 80° C. to obtain a decylnorbornene/norbornene (7:3) copolymer (PDe-7-NB-3).

Preparation Example 12

Polymerization of Triethoxy Silyl Norbornene

A triethoxy silyl norbornene monomer and purified toluene were added to a polymerization reactor in a 1:1 weight ratio.

0.02 mol % (for the monomer content) of Ni(ethylhexanoate) dissolved in toluene, as a catalyst, and 0.18 mol % (for the monomer content) of tris(pentafluorophenyl)boron and 0.2 mol % (for the monomer content) of triethylaluminum dissolved in toluene, as cocatalysts, were added to the reactor. Reaction was carried out for 18 hours while stirring at room temperature.

After the reaction was completed, the reaction mixture was added to a methylene chloride solution after dissolving a small amount of hydroxyquinoline therein. After stirring for 12 hours, the solution was added to excess ethanol to obtain a white copolymer precipitate. The precipitate was filtered with a glass funnel, and the collected copolymer was dried in a vacuum oven for 24 hours at 70° C. to obtain a triethoxy silyl norbornene polymer (PTesNB).

Preparation Example 13

Polymerization of Acetate Norbornene

An acetate norbornene monomer and purified toluene were added to a polymerization reactor in a 1:1 weight ratio.

0.03 mol % (for the monomer content) of Pd(acac)$_2$ and 0.03 mol % (for the monomer content) of tricyclohexylphosphine dissolved in toluene, as catalysts, and 0.06 mol % (for the monomer content) of dimethylanilinium tetrakis(pentafluorophenyl)borate dissolved in CH$_2$Cl$_2$, as a cocatalyst, were added to the reactor. Reaction was carried out for 17 hours while stirring at 80° C.

After the reaction was completed, the reaction mixture was added to excess ethanol to obtain a white copolymer precipitate. The precipitate was filtered with a glass funnel, and the collected copolymer was dried in a vacuum oven for 24 hours at 80° C. to a obtain norbornene acetate polymer (PAcNB).

Examples 1 to 14

(Preparation of Film)

Each polymer obtained in Preparation Examples 1 to 13 was prepared into a solution having compositions of Table 1 below. Each coating solution was cast on a glass plate using a knife coater or a bar coater. The glass plate was dried at room temperature for 1 hour, and then under nitrogen at 100° C. for 18 hours. After keeping at −10° C. for 10 seconds, a film formed on the glass plate was peeled with a knife to obtain a transparent film with a thickness deviation being below 2%. Thickness and optical transmittivity at 400 to 800 nm of each film are also shown in Table 1.

TABLE 1

| | Film solution composition (parts by weight) | | | Physical properties | |
|---|---|---|---|---|---|
| Classification | Polymer | Additives | Solvent | Thickness (μm) | Optical transmittivity (%) |
| Example 1 | PMeNB (Preparation Example 1), 100 | — | THF, 560 | 114 | 92 |
| Example 2 | PBeNB (Preparation Example 2), 100 | — | MC, 360; Toluene, 200 | 120 | 92 |
| Example 3 | PBe-7-Me-3-NB (Preparation Example 3), 100 | — | Toluene 560 | 103 | 91 |
| Example 4 | PBe-7-Me-3-NB (Preparation Example 3), 100 | TPP, 5; Irganox 1,010, 0.3 | MC, 360; Toluene, 200 | 105 | 91 |
| Example 5 | PBe-5-Me-5-NB (Preparation Example 4), 100 | — | Toluene, 560 | 110 | 92 |
| Example 6 | PBe-3-Me-7-NB (Preparation Example 5), 100 | — | Toluene, 480 | 97 | |

TABLE 1-continued

| Classification | Film solution | | | Physical properties | |
| | composition (parts by weight) | | | Thickness | Optical transmittivity |
| | Polymer | Additives | Solvent | (μm) | (%) |
|---|---|---|---|---|---|
| Example 7 | PBu-7-Me-3-NB (Preparation Example 6), 100 | — | Toluene, 560 | 98 | 92 |
| Example 8 | PBu-5-Me-5-NB (Preparation Example 7), 100 | — | Toluene, 560 | 105 | 92 |
| Example 9 | PBu-3-Me-7-NB (Preparation Example 8), 100 | — | Toluene, 730 | 101 | 91 |
| Example 10 | PBuNB (Preparation Example 9), 100 | — | Toluene, 400 | 99 | 91 |
| Example 11 | POc-8-NB-2 (Preparation Example 10), 100 | — | Toluene, 400 | 105 | 91 |
| Example 12 | PDe-7-NB-3 (Preparation Example 11), 100 | — | Toluene, 400 | 107 | 91 |
| Example 13 | PtesNB (Preparation Example 12), 100 | — | Toluene, 350 | 106 | 92 |
| Example 14 | PacNB (Preparation Example 13), 100 | — | THF, 500; Toluene, 300 | 95 | 91 |

In Table 1, TPP stands for phosphoric acid ester of triphenyl phosphate; THF stands for tetrahydrofuran; and MC stands for methylenechloride.

(Optical Anisotropy Measurement)

The refractive index (n) of each transparent film of Examples 1 to 14 was measured using an Abbe refractometer, and the in-plane phase difference value ($R_e$) was measured with an automatic birefringence meter (KOBRA-21 ADH; Wang Ja). The phase difference value ($R_\theta$) was measured when the angle between the incident light and the film surface was 50°, and the phase difference ($R_{th}$) along the film thickness direction and in-plane x-axis was calculated by the following Equation 3:

$$R_{th} = \frac{R_\theta \times \cos\theta_f}{\sin^2\theta_f} \qquad \text{Equation 3}$$

The refractive index difference [($n_x-n_y$) and ($n_y-n_z$)] was calculated by dividing $R_e$ and $R_{th}$ by film thickness. The refractive index difference, $R_\theta$, and $R_{th}$ values of each transparent film are shown in the following Table 2.

TABLE 2

| Classification | Polymer | n (refractive index) | $(n_x - n_y) \times 10^3$ | $R_{th}$ (nm/μm) | $(n_y - n_z) \times 10^3$ |
|---|---|---|---|---|---|
| Example 1 | PMeNB (Preparation Example 1) | 1.52 | 0.008 | 5.78 | 5.78 |
| Example 2 | PbeNB (Preparation Example 2) | 1.50 | 0.009 | 2.13 | 2.13 |
| Example 3 | PBe-7-Me-3-NB (Preparation Example 3) | 1.51 | 0.012 | 3.29 | 3.29 |
| Example 4 | PBe-7-Me-3-NB (Preparation Example 3) | 1.51 | 0.014 | 2.79 | 2.79 |
| Example 5 | PBe-5-Me-5-NB (Preparation Example 4) | 1.51 | 0.013 | 3.59 | 3.59 |

TABLE 2-continued

| Classification | Polymer | n (refractive index) | $(n_x - n_y) \times 10^3$ | $R_{th}$ (nm/μm) | $(n_y - n_z) \times 10^3$ |
|---|---|---|---|---|---|
| Example 6 | PBe-3-Me-7-NB (Preparation Example 5) | 1.52 | 0.020 | 4.35 | 4.35 |
| Example 7 | PBu-7-Me-3-NB (Preparation Example 6) | 1.52 | 0.015 | 3.63 | 3.63 |
| Example 8 | PBu-5-Me-5-NB (Preparation Example 7) | 1.51 | 0.007 | 3.98 | 3.98 |
| Example 9 | PBu-5-Me-5-NB (Preparation Example 8) | 1.51 | 0.009 | 4.25 | 4.25 |
| Example 10 | PbuNB (Preparation Example 9) | 1.50 | 0.008 | 1.44 | 1.44 |
| Example 11 | POc-8-NB-2 (Preparation Example 10) | 1.50 | 0.013 | 1.28 | 1.28 |
| Example 12 | PDe-7-NB-3 (Preparation Example 11) | 1.50 | 0.019 | 0.79 | 0.79 |
| Example 13 | PtesNB (Preparation Example 12) | 1.52 | 0.008 | 1.47 | 1.47 |
| Example 14 | PacNB (Preparation Example 13) | 1.52 | 0.015 | 5.46 | 5.46 |

When $R_\theta$ was measured after putting the films on a triacetate cellulose film ($n_y > n_z$), $R_\theta$ values of all cycloolefin films increased. This shows that the $R_{th}$ of cycloolefin films results from negative birefringence along the thickness direction ($n_y > n_z$).

Examples 15 to 18

To identify the effect of drying condition on the $R_{th}$ value, films were prepared under a variety of drying conditions as shown in Table 3 below. Drying conditions were at 100° C. for 18 hours while: injecting nitrogen gas at 10 mg/min into drying oven; drying under vacuum; and drying in the air. Other film preparation conditions were the same as in Examples 3 and 5. The $R_{th}$ measurement result showed that the drying condition does not substantially affect the $R_{th}$ value.

Example 19

Wavelength Dispersive Characteristic of Phase Difference

The in-plane phase difference value ($R_e$) was measured with an automatic birefringence meter (KOBRA-21 ADH; Wang Ja). The phase difference value ($R_\theta$) was measured when the angle between the incident light and the film surface was 50°, and the phase difference ($R_{th}$) along the film thickness direction and in-plane x-axis was calculated by the aforementioned Equation 3.

For each transparent film prepared in Examples 2 to 13, $R_\theta$ values for different wavelengths (λ=479.4 nm, 548 nm, 629 nin, 747.7 nm) were measured at an incident angle of 50° using an automatic birefringence meter (KOBRA-21 ADH; Wang Ja). The ratio to the $R_\theta$ value at standard wavelength ($\lambda_0$=550 nm), $R_{50}(\lambda)/R_{50}(\lambda_0)$, was calculated. The results are shown in Table 4 below.

TABLE 3

| Classification | Polymer | Drying method | Pre-drying | Post-drying | $R_{th}$ (nm/μm) |
|---|---|---|---|---|---|
| Example 15 | PBe-5-Me-5-NB (Preparation Example 4) | Vacuum | Room temperature, 1 hour | 100° C., 18 hours | 3.56 |
| Example 16 | PBe-5-Me-5-NB (Preparation Example 4) | Nitrogen flow | Room temperature, 1 hour | 100° C., 18 hours | 3.58 |
| Example 17 | PBe-7-Me-3-NB (Preparation Example 3) | Vacuum | Room temperature, 1 hour | 100° C., 18 hours | 3.33 |
| Example 18 | PBe-7-Me-3-NB (Preparation Example 3) | Air | Room temperature, 1 hour | 100° C., 18 hours | 3.31 |

TABLE 4

| Classification | Polymer | $R_{50}(479.4)/R_{50}(\lambda_0)$ | $R_{50}(548)/R_{50}(\lambda_0)$ | $R_{50}(629)/R_{50}(\lambda_0)$ | $R_{50}(747.7)/R_{50}(\lambda_0)$ |
|---|---|---|---|---|---|
| Example 2 | PbeNB (Preparation Example 2) | 1.007 | 1.000 | 0.998 | 0.987 |
| Example 3 | PBe-7-Me-3-NB (Preparation Example 3) | 1.007 | 1.000 | 1.000 | 0.983 |
| Example 4 | PBe-7-Me-3-NB (Preparation Example 3) | 1.010 | 1.000 | 0.997 | 0.965 |
| Example 5 | PBe-5-Me-5-NB (Preparation Example 4) | 1.008 | 1.000 | 1.000 | 0.992 |
| Example 6 | PBe-3-Me-7-NB (Preparation Example 5) | 1.007 | 1.000 | 0.997 | 0.968 |
| Example 7 | PBu-7-Me-3-NB (Preparation Example 6) | 1.010 | 1.000 | 0.993 | 0.983 |
| Example 8 | PBu-5-Me-5-NB (Preparation Example 7) | 1.005 | 1.000 | 0.997 | 0.972 |
| Example 9 | PBu-3-Me-7-NB (Preparation Example 8) | 1.008 | 1.000 | 0.998 | 0.975 |
| Example 10 | PbuNB (Preparation Example 9) | 1.014 | 1.000 | 1.000 | 0.970 |
| Example 11 | POc-8-NB-2 (Preparation Example 10) | 1.004 | 1.000 | 0.981 | 0.967 |
| Example 12 | PDe-7-NB-3 (Preparation Example 11) | 1.014 | 1.001 | 0.986 | 0.980 |
| Example 13 | PtesNB (Preparation Example 12) | 1.017 | 1.000 | 0.974 | 0.969 |

Example 18

Water Absorptivity

Three specimens of triacetate cellulose film (thickness=80 μm) and PBeNB film of Example 2 (thickness=120 μm), each measuring 5×5 cm; were prepared. Each specimen was immersed in water at room temperature. After 24 hours and 120 hours, the specimens were taken out. Water on the specimen surface was wiped and the weight difference was measured. The results are shown in Table 5 below.

TABLE 5

| Classification | Water absorptivity of PBeNB (%) | Water absorptivity of TAC (%) |
|---|---|---|
| After 24 hours | 0.17 ± 0.02 | 1.23 ± 0.12 |
| After 120 hours | 0.17 ± 0.02 | 1.23 ± 0.12 |

Example 19

Effect of Additives on Heat Resistance

The polybutyl ester-methyl ester (7:3) copolymer film of Example 3 and the film of Example 4, which further comprises 5 wt % of triphenyl phosphate and 0.3 wt % of Irganox 1010 as additives, were kept at 150° C. for 3 hours, and then optical transmittivity was measured.

The polybutyl ester-methyl ester (7:3) copolymer film of Example 3 showed an optical transmittivity of 89% in the range from 400 to 800 nm. The polybutyl ester-methyl ester film of Example 4 showed an optical transmittivity of 91%. There was no significant difference in mechanical properties.

Example 20

Surface Treatment and Lamination with PVA Polarizing Film

For the polybutyl ester norbornene film of Example 2, contact angle was measured to calculate surface tension from the following Equations 7 and 8 (Wu, S. *J. Polym. Sci.* C Vol 34, p19, 1971):

$$\gamma_S = \gamma_{SL} + \gamma_{LV} \cos\theta \qquad \text{Equation 7}$$

$$\gamma_{SL} = \gamma_S + \gamma_{LV} - 4\left(\frac{\gamma_{LV}^d \gamma_S^d}{\gamma_{LV}^d + \gamma_S^d} + \frac{\gamma_{LV}^p \gamma_S^p}{\gamma_{LV}^p + \gamma_S^p}\right) \qquad \text{Equation 8}$$

In Equations 7 and 8, $\gamma_S$ is surface tension of the film, $\gamma_{LV}$ is surface tension of the liquid, $\gamma_{SL}$ is interfacial tension of the film and liquid, θ is the contact angle, $\gamma^d$ is the dispersion term of surface tension, and $\gamma^p$ is the polar term of surface tension.

When water ($\gamma^d$=44.1, $\gamma^p$=6.7 mN/m) was used the contact angle was 74.3°, and when diiodomethane ($\gamma^d$=22.1, $\gamma^p$=50.7 mN/m) was used it was 33.5°. From these values, the surface tension was calculated to be 49.5 mN/m.

The polybutyl ester norbornene film was corona treated at 6 m/min of line speed 3 times, and the contact angle was measured again. The contact angle was 20.7° for water and 22° for diiodomethane. The surface tension was calculated to be 76.9 mN/m.

Within 30 minutes of corona treatment, the film was roll-laminated on a sufficiently dried PVA (polyvinylalcohol) polarizing film using a 10 wt % PVA aqueous solution, and dried for 10 minutes at 80'. The PVA polarizing film had superior adhesivity.

The negative C-plate type optical anisotropic film comprising a polycycloolefin of the present invention can be used for optical compensation films of a variety of LCD (liquid crystal display) modes because the refractive index along the thickness direction can be controlled by the kind and amount of functional groups.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative C-plate optical anisotropic film comprising a polycycloolefin, wherein the polycycloolefin comprises repeating units derived from compounds represented by the following Chemical Formula 1, and wherein the optical anisotropic film has a retardation value ($R_{th}$), defined by the following Equation 1, of 30 to 1000 nm when the film thickness is 30 to 200 μm:

$$R_{th} = \Delta(n_y - n_z) \times d \quad \text{Equation 1}$$

wherein $n_y$ is the in-plane refractive index along the transverse direction or along the fast axis measured at a wavelength of 550 nm;

$n_z$ is the refractive index along the thickness direction measured at a wavelength of 550 nm; and d is the film thickness:

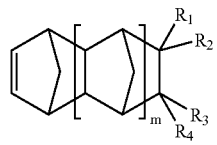

Chemical Formula 1 wherein m is an integer from 0 to 4;

at least one of $R_1$, $R_2$, $R_3$ and $R_4$ is a polar functional group, the remaining are non-polar functional groups, and $R_1$, $R_2$, $R_3$ and $R_4$ can be bonded together to form a $C_1$ to $C_{10}$ alkylidene group, a $C_4$ to $C_{12}$ saturated or unsaturated cyclic group, or a $C_6$ to $C_{24}$ aromatic cyclic compound, the non-polar functional group is selected from the group consisting of hydrogen; a halogen; a $C_1$ to $C_{20}$ straight or branched alkyl, alkenyl or vinyl; a $C_4$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; and a $C_3$ to $C_{20}$ alkynyl;

the polar functional group is selected from the group consisting of a $C_1$ to $C_{20}$ linear or branched haloalkyl, haloalkenyl or halovinyl; a $C_4$ to $C_{12}$ halocycloalkyl substituted by a hydrocarbon or unsubstituted; a $C_6$ to $C_{40}$ haloaryl substituted by a hydrocarbon or unsubstituted; a $C_7$ to $C_{15}$ haloaralkyl substituted by a hydrocarbon or unsubstituted; a $C_3$ to $C_{20}$ haloalkynyl; and non-hydrocarbonaceous polar group selected from the group consisting of following formulae,

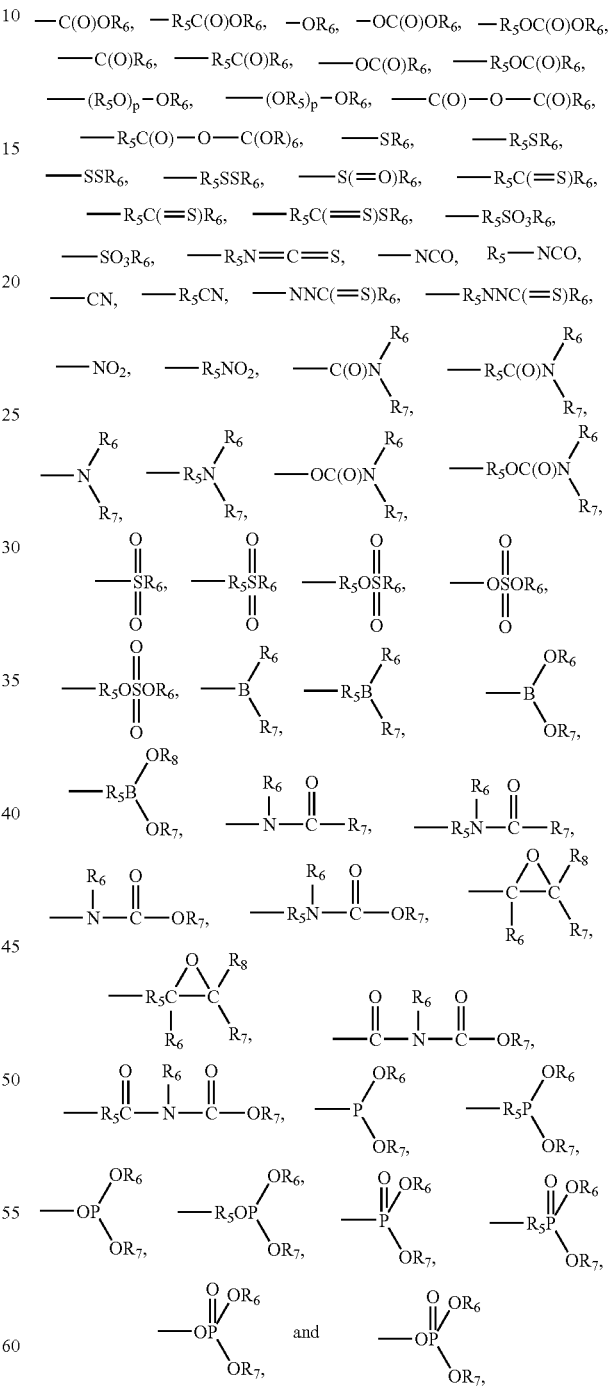

wherein each $R_5$ is a $C_1$ to $C_{20}$ linear or branched alkyl, haloalkyl, alkenyl, haloalkenyl, vinyl, halovinyl; a $C_4$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_7$ to $C_{15}$ aralkyl or haloaralkyl substituted by a hydrocarbon or unsubstituted; or a $C_3$ to $C_{20}$ alkynyl or haloalkynyl, each of $R_6$ and $R_7$ is hydrogen; a halogen; a $C_1$ to $C_{20}$ linear or branched alkyl, haloalkyl, alkenyl, haloalkenyl, vinyl, halovinyl, alkoxy, haloalkoxy, carbonyloxy, halocarbonyloxy; a $C_4$ to $C_{12}$ cycloalkyl or halocycloalkyl substituted by a hydrocarbon or unsubstituted; a $C_6$ to $C_{40}$ aryl, haloaryl, aryloxy, or haloaryloxy substituted by a hydrocarbon or unsubstituted; a $C_7$ to $C_{15}$ aralkyl or haloaralkyl substituted by a hydrocarbon or unsubstituted; a $C_3$ to $C_{20}$ alkynyl or haloalkynyl, and p is an integer of 1 to 10.

2. The optical anisotropic film according to claim 1, wherein said polycycloolefin is:
  i) a homopolymer of compounds represented by Chemical Formula 1; or
  ii) a copolymer of two or more different compounds represented by Chemical Formula 1.

3. The optical anisotropic film according to claim 1, wherein said polycycloolefin is a homopolymer of norbornene-based monomers having polar functional groups or a copolymer of norbornene-based monomers having different polar functional groups.

4. The optical anisotropic film according to claim 1, wherein said polycycloolefin is a copolymer further comprising additional norbornene-based monomers having nonpolar functional groups represented by the following Chemical Formula 1:

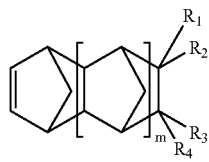

Chemical Formula 1 wherein m is an integer of 0 to 4;

$R_1$, $R_2$, $R_3$, and $R_4$ are, independently or simultaneously, hydrogen; a halogen; a $C_1$ to $C_{20}$ linear or branched alkyl, alkenyl or vinyl; a $C_4$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; $C_3$ to $C_{20}$ alkynyl; a $C_1$ to $C_{20}$ linear or branched haloalkyl, haloalkenyl or halovinyl; a $C_5$ to $C_{12}$ halocycloalkyl substituted by a hydrocarbon or unsubstituted; a $C_6$ to $C_{40}$ haloaryl substituted by a hydrocarbon or unsubstituted; a $C_7$ to $C_{15}$ haloaralkyl substituted by a hydrocarbon or unsubstituted; or a $C_3$ to $C_{20}$ haloalkynyl; and if $R_1$, $R_2$, $R_3$, and $R_4$ are not hydrogen or a halogen, $R_1$ and $R_2$, or $R_3$ and $R_4$ are connected to each other to form a $C_1$ to $C_{10}$ alkylidene group, or $R_1$ or $R_2$ are connected with $R_3$ or $R_4$ to form a $C_4$ to $C_{12}$ saturated or unsaturated cyclic group, or a $C_6$ to $C_{24}$ aromatic cyclic compound.

5. The optical anisotropic film according to claim 1, wherein said film comprises blends composed of one or more addition polymerized polycycloolefin polymers.

6. The optical anisotropic film according to claim 1, wherein said polycycloolefin is prepared by addition polymerization of norbornene-based monomers in the presence of a group 10 transition metal catalyst.

7. The optical anisotropic film according to claim 1, wherein said polycycloolefin is prepared by a method comprising a step of contacting norbornene-based monomers having polar functional groups with a catalyst system comprising:
  i) a group 10 transition metal compound, as a catalyst;
  ii) an organic compound comprising a neutral group 15 electron donor ligand having lone pair electrons and thus capable of acting as an electron donor, as a cocatalyst; and
  iii) a salt comprising a group 13 element capable of offering an anion which can be weakly coordinated to said transition metal, as a cocatalyst.

8. The optical anisotropic film comprising a polycycloolefin having ester groups or acetyl groups according to claim 1, wherein said polycycloolefin is prepared by a method comprising a step of contacting norbornene-based monomers having ester groups or acetyl groups with a catalyst system comprising:
  i) a group 10 transition metal compound;
  ii) a compound comprising a neutral group 15 electron donor ligand, a cone angle of which is at least 160°; and
  iii) a salt capable of offering an anion which can be weakly coordinated to said transition metal of i).

9. The optical anisotropic film according to claim 1, which is prepared by the solution casting method comprising a step of dissolving a polycycloolefin in a solvent and casting the solution into a film.

10. The optical anisotropic film according to claim 1, which is surface treated by one or more surface treatment methods selected from the group consisting of corona discharge, glow discharge, flame, acid, alkali, UV radiation, and coating.

11. An optically anisotropic transparent film, comprising a polycycloolefin, wherein the polycycloolefin comprises repeating units derived from compounds represented by the following Chemical Formula 1, the optically anisotropic transparent film having a retardation value ($R_{th}$) defined by the following Equation 1 ranging from 30 to 1000 nm, phase difference ratios at two wavelengths at a given declined angle being ($R_{450}/R_{550}$)=1 to 1.05 and ($R_{650}/R550$)=0.95 to 1:

wherein $R_{450}$ is the phase difference at a wavelength of 450 nm, $R_{550}$ is the phase difference at a wavelength of 550 nm, and $R_{650}$ is the phase difference at a wavelength of 650 nm:

$$R_{th}=\Delta(n_y-n_z)\times d \qquad \text{Equation 1}$$

wherein $n_y$ is the in-plane refractive index along the fast axis measured at a wavelength of 550 nm;

$n_z$ is the refractive index along the thickness direction measured at a wavelength of 550 nm; and d is the film thickness

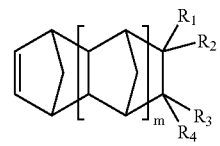

Chemical Formula 1 wherein m is an integer from 0 to 4;

at least one of $R_1$, $R_2$, $R_3$ and $R_4$ is a polar functional group, the remaining are non-polar functional groups, and $R_1$, $R_2$, $R_3$ and $R_4$ can be bonded together to form a $C_1$ to $C_{10}$ alkylidene group, a $C_4$ to $C_{12}$ saturated or unsaturated cyclic group, or a $C_6$ to $C_{24}$ aromatic cyclic compound, the non-polar functional group is selected from the group consisting of hydrogen; a halogen; a $C_1$ to $C_{20}$ straight or branched alkyl, alkenyl or vinyl; a $C_4$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; and a $C_3$ to $C_{20}$ alkynyl;

the polar functional group is selected from the group consisting of a $C_1$ to $C_{20}$ linear or branched haloalkyl, haloalkenyl or halovinyl; a $C_4$ to $C_{12}$ halocycloalkyl substituted by a hydrocarbon or unsubstituted; a $C_6$ to $C_{40}$ haloaryl substituted by a hydrocarbon or unsubstituted; a $C_7$ to $C_{15}$ haloaralkyl substituted by a hydrocarbon or unsubstituted; a $C_3$ to $C_{20}$ haloalkynyl; and non-hydrocarbonaceous polar group selected from the group consisting of following formulae,

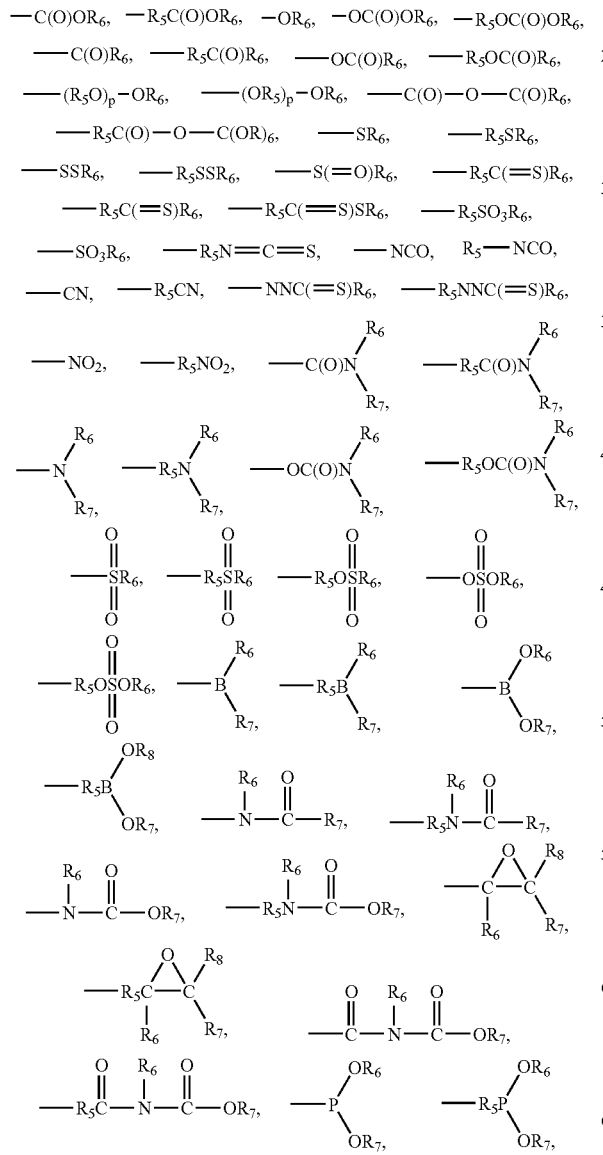

-continued

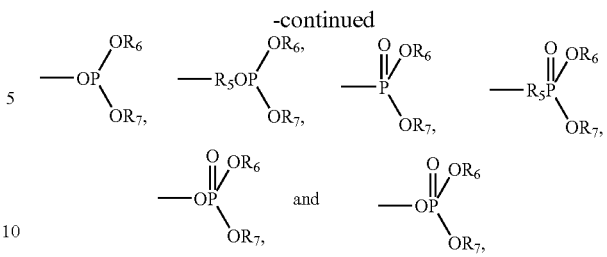

wherein each $R_5$ is a $C_1$ to $C_{20}$ linear or branched alkyl, haloalkyl, alkenyl, haloalkenyl, vinyl, halovinyl; a $C_4$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_7$ to $C_{15}$ aralkyl or haloaralkyl substituted by a hydrocarbon or unsubstituted; or a $C_3$ to $C_{20}$ alkynyl or haloalkynyl, each of $R_6$ and $R_7$ is hydrogen; a halogen; a $C_1$ to $C_{20}$ linear or branched alkyl, haloalkyl, alkenyl, haloalkenyl, vinyl, halovinyl, alkoxy, haloalkoxy, carbonyloxy, halocarbonyloxy; a $C_4$ to $C_{12}$ cycloalkyl or halocycloalkyl substituted by a hydrocarbon or unsubstituted; a $C_6$ to $C_{40}$ aryl, haloaryl, aryloxy, or haloaryloxy substituted by a hydrocarbon or unsubstituted; a $C_7$ to $C_{15}$ aralkyl or haloaralkyl substituted by a hydrocarbon or unsubstituted; a $C_3$ to $C_{20}$ alkynyl or haloalkynyl, and p is an integer of 1 to 10.

12. The optically anisotropic transparent film according to claim 11, which has optical transmittivity in the range from 400 to 800 nm of at least 90%.

13. An optical anisotropic compensation film for a liquid crystal display comprising a polycycloolefin, refractive indices of the optical anisotropic film satisfying the following Equation 5:

$$n_x \approx n_y > n_z \qquad \text{Equation 5}$$

wherein $n_x$=in-plane refractive index along the slow axis; $n_y$=refractive index along the fast axis; and $n_z$=refractive index along the thickness direction; wherein the polycycloolefin comprises repeating units derived from compounds represented by the following Chemical Formula 1:

Chemical Formula 1

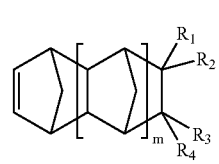

wherein m is an integer from 0 to 4;

at least one of $R_1$, $R_2$, $R_3$ and $R_4$ is a polar functional group, the remaining are non-polar functional group, and $R_1$, $R_2$, $R_3$ and $R_4$ can be bonded together to form a $C_1$ to $C_{10}$ alkylidene group, a $C_4$ to $C_{12}$ saturated or unsaturated cyclic group, or a $C_6$ to $C_{24}$ aromatic cyclic compound, the non-polar functional group is selected from the group consisting of hydrogen; a halogen; a $C_1$ to $C_{20}$ straight or branched alkyl, alkenyl or vinyl; a $C_4$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; and a $C_3$ to $C_{20}$ alkynyl;

the polar functional group is selected from the group consisting of a $C_1$ to $C_{20}$ linear or branched haloalkyl, haloalkenyl or halovinyl; a $C_4$ to $C_{12}$ halocycloalkyl substituted by a hydrocarbon or unsubstituted; a $C_6$ to $C_{40}$ haloaryl substituted by a hydrocarbon or unsubstituted; a $C_7$ to $C_{15}$ haloaralkyl substituted by a hydrocarbon or unsubstituted; a $C_3$ to $C_{20}$ haloalkynyl; and non-hydrocarbonaceous polar group selected from the group consisting of following formulae,

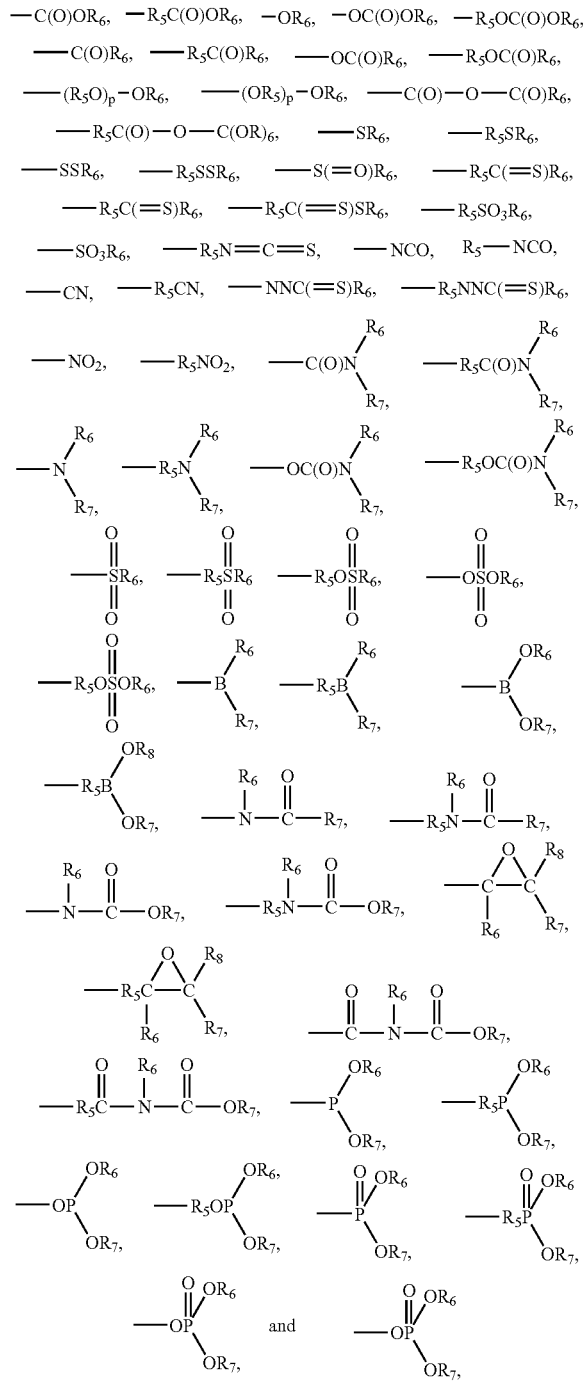

wherein each $R_5$ is a $C_1$ to $C_{20}$ linear or branched alkyl, haloalkyl, alkenyl, haloalkenyl, vinyl, halovinyl; a $C_4$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_7$ to $C_{15}$ aralkyl or haloaralkyl substituted by a hydrocarbon or unsubstituted; or a $C_3$ to $C_{20}$ alkynyl or haloalkynyl, each of $R_6$ and $R_7$ is hydrogen; a halogen; a $C_1$ to $C_{20}$ linear or branched alkyl, haloalkyl, alkenyl, haloalkenyl, vinyl, halovinyl, alkoxy, haloalkoxy, carbonyloxy, halocarbonyloxy; a $C_4$ to $C_{12}$ cycloalkyl or halocycloalkyl substituted by a hydrocarbon or unsubstituted; a $C_6$ to $C_{40}$ aryl, haloaryl, aryloxy, or haloaryloxy substituted by a hydrocarbon or unsubstituted; a $C_7$ to $C_{15}$ aralkyl or haloaralkyl substituted by a hydrocarbon or unsubstituted; a $C_3$ to $C_{20}$ alkynyl or haloalkynyl, and p is an integer of 1 to 10.

14. The optical anisotropic compensation film according to claim 13, which has a retardation value ($R_{th}$), defined by the following Equation 1, of 30 to 1000 nm when the film thickness is 30 to 200 µm:

$$R_{th} = \Delta(n_y - n_z) \times d \qquad \text{Equation 1}$$

wherein $n_y$ is the in-plane refractive index along the fast axis measured at a wavelength of 550 nm;

$n_z$ is the refractive index along the thickness direction measured at a wavelength of 550 nm; and d is the film thickness.

15. A method for preparing an optical anisotropic film comprising the steps of:

a) addition polymerizing norbornene-based monomers represented by the following Formula 1 to prepare a norbornene-based addition polymer;

b) dissolving said norbornene-based addition polymer in a solvent to prepare a norbornene-based addition polymer solution; and c) coating or casting said norbornene-based addition polymer solution on a plate and drying the same;

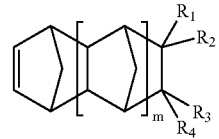

Chemical Formula 1 wherein m is an integer from 0 to 4;

at least one of $R_1$, $R_2$, $R_3$ and $R_4$ is a polar functional group, the remaining are non-polar functional group, and $R_1$, $R_2$, $R_3$ and $R_4$ can be bonded together to form a $C_1$ to $C_{10}$ alkylidene group, a $C_4$ to $C_{12}$ saturated or unsaturated cyclic group, or a $C_6$ to $C_{24}$ aromatic cyclic compound, the non-polar functional group is selected from the group consisting of hydrogen; a halogen; a $C_1$ to $C_{20}$ straight or branched alkyl, alkenyl or vinyl; a $C_4$ to $C_{12}$ cycloalkyl substituted by a hydrocarbon or unsubstituted; a $C_6$ to $C_{40}$ aryl substituted by a hydrocarbon or unsubstituted; a $C_7$ to $C_{15}$ aralkyl substituted by a hydrocarbon or unsubstituted; and a $C_3$ to $C_{20}$ alkynyl;

the polar functional group is selected from the group consisting of a $C_1$ to $C_{20}$ linear or branched haloalkyl, haloalkenyl or halovinyl; a $C_4$ to $C_{12}$ halocycloalkyl substituted by a hydrocarbon or unsubstituted; a $C_6$ to $C_{40}$ haloaryl substituted by a hydrocarbon or unsubstituted; a $C_7$ to $C_{15}$ haloaralkyl substituted by a hydrocarbon or unsubstituted; a $C_3$ to $C_{20}$ haloalkynyl; and non-hydrocarbonaceous polar group selected from the group consisting of following formulae,

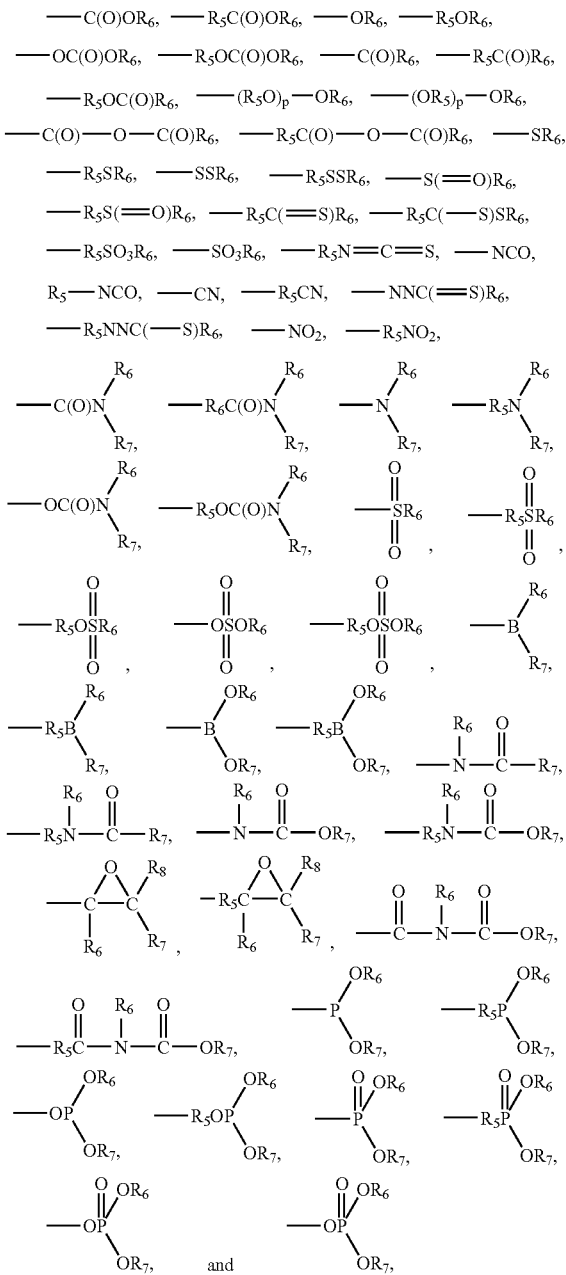

wherein each $R_5$ is a $C_1$ to $C_{20}$ linear or branched alkyl, haloalkyl, alkenyl, haloalkenyl, vinyl, halovinyl; a $C_4$ to $C_{12}$ cycloalkyl or halocycloalkyl substituted by a hydrocarbon or unsubstituted; a $C_6$ to $C_{40}$ aryl or haloaryl substituted by a hydrocarbon or unsubstituted; a $C_7$ to $C_{15}$ aralkyl or haloaralkyl substituted by a hydrocarbon or unsubstituted; or a $C_3$ to $C_{20}$ alkynyl or haloalkynyl, each of $R_6$ and $R_7$ is hydrogen; a halogen; a $C_1$ to $C_{20}$ linear or branched alkyl, haloalkyl, alkenyl, haloalkenyl, vinyl, halovinyl, alkoxy, haloalkoxy, carbonyloxy, halocarbonyloxy; a $C_4$ to $C_{12}$ cycloalkyl or halocycloalkyl substituted by a hydrocarbon or unsubstituted; a $C_6$ to $C_{40}$ aryl, haloaryl, aryloxy, or haloaryloxy substituted by a hydrocarbon or unsubstituted; a $C_7$ to $C_{15}$ aralkyl or haloaralkyl substituted by a hydrocarbon or unsubstituted; a $C_3$ to $C_{20}$ alkynyl or haloalkynyl, and p is an integer of 1 to 10, and wherein refractive indices of said film satisfy the following Equation 5:

$$n_x \approx n_y > n_z \qquad \text{Equation 5}$$

wherein $n_x$=in-plane refractive index along the slow axis; $n_y$=refractive index along the fast axis; and $n_z$=refractive index along the thickness direction.

16. The method for preparing an optical anisotropic film according to claim 15, which further comprises a step of surface treating the film obtained by casting with corona discharge, glow discharge, flame, acid, alkali, UV radiation, or coating.

17. The method for preparing an optical anisotropic film according to claim 15, wherein said solution of step b) further comprises one or more additives selected from the group consisting of a plasticizer, an antideteriorant, a UV stabilizer, and an antistatic agent.

18. The method for preparing an optical anisotropic film according to claim 15, wherein said solution of step b) further comprises one or more materials selected from the group consisting of an ether having 3 to 12 carbon atoms, a ketone having 3 to 12 carbon atoms, an ester having 3 to 12 carbon atoms, a halogenated hydrocarbon having 1 to 6 carbon atoms, and an aromatic compound.

19. A liquid crystal display comprising the optical anisotropic film of claim 1.

20. The liquid crystal display according to claim 19, wherein refractive indices of the liquid crystal layer satisfy the following Equation 6 when the voltage is applied ON or OFF state:

$$n_x \approx n_y < n_z \qquad \text{Equation 6}$$

wherein $n_x$=in-plane refractive index along the slow axis; $n_y$=refractive index along the fast axis; and $n_z$=refractive index along the thickness direction.

* * * * *